(12) United States Patent
Wang et al.

(10) Patent No.: US 10,352,567 B2
(45) Date of Patent: Jul. 16, 2019

(54) FUEL-AIR PREMIXER FOR A GAS TURBINE

(71) Applicant: GENERAL ELECTRIC COMPANY, Schenectady, NY (US)

(72) Inventors: Liangyu Wang, Niskayuna, NY (US); Anthony John Dean, Scotia, NY (US); Keith Robert McManus, Clifton Park, NY (US); Kapil Kumar Singh, Clifton Park, NY (US); Suhui Li, Niskayuna, NY (US); Sravan Kumar Dheeraj Kapilavai, Niskayuna, NY (US); Mathew Paul Thariyan, Clifton Park, NY (US); Owen Graham, Albany, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 895 days.

(21) Appl. No.: 14/879,793

(22) Filed: Oct. 9, 2015

(65) Prior Publication Data
US 2017/0102147 A1  Apr. 13, 2017

(51) Int. Cl.
*F23R 3/14* (2006.01)
*F23D 11/38* (2006.01)
(Continued)

(52) U.S. Cl.
CPC .............. *F23R 3/14* (2013.01); *F02C 3/04* (2013.01); *F02C 7/222* (2013.01); *F23D 11/107* (2013.01);
(Continued)

(58) Field of Classification Search
CPC .............. F23D 11/107; F23D 11/383; F23D 2900/14021; F23R 3/30
See application file for complete search history.

(56) References Cited

U.S. PATENT DOCUMENTS 5,165,241 A * 11/1992 Joshi ..................... F23R 3/14
60/737
5,351,477 A * 10/1994 Joshi ..................... F23C 7/004
239/400
(Continued)

FOREIGN PATENT DOCUMENTS

| EP | 1 923 637 A2 | 5/2008 |
|---|---|---|
| WO | 03/04431 A1 | 5/2003 |

OTHER PUBLICATIONS

Extended European Search Report and Opinion issued in connection with corresponding EP Application No. 16190417.2 dated Mar. 8, 2017.
(Continued)

*Primary Examiner* — Gerald L Sung
*Assistant Examiner* — Marc J Amar
(74) *Attorney, Agent, or Firm* — Fletcher Yoder, P.C.

(57) ABSTRACT

The present disclosure relates to a fuel-air premixer for a turbine system. The fuel-air premixer includes a swirler and a centerbody. The swirler is configured to direct a flow of air through the premixer, and the centerbody is configured to inject fuel into the flow of air. Additionally, the centerbody includes an airfoil shape that reduces and/or substantially eliminates recirculation pockets to prevent autoignition and/or flame holding in a combustion chamber. Accordingly, the turbine system may produce fewer $NO_x$ emissions.

4 Claims, 6 Drawing Sheets

(51) Int. Cl.
*F23R 3/30* (2006.01)
*F23D 11/10* (2006.01)
*F23R 3/28* (2006.01)
*F02C 3/04* (2006.01)
*F02C 7/22* (2006.01)

(52) U.S. Cl.
CPC ............ *F23D 11/383* (2013.01); *F23R 3/286* (2013.01); *F23R 3/30* (2013.01); *F05D 2220/32* (2013.01); *F05D 2260/14* (2013.01); *F23C 2900/07001* (2013.01); *F23D 2900/14021* (2013.01); *Y02T 50/675* (2013.01)

(56) References Cited

U.S. PATENT DOCUMENTS

| | | | |
|---|---|---|---|
| 5,675,971 A | 10/1997 | Angel et al. | |
| 5,680,766 A | 10/1997 | Joshi et al. | |
| 5,778,676 A | 7/1998 | Joshi et al. | |
| 5,794,449 A | 8/1998 | Razdan et al. | |
| 5,813,232 A * | 9/1998 | Razdan | F23D 14/02 239/403 |
| 5,822,992 A * | 10/1998 | Dean | F23D 11/104 60/737 |
| 6,141,967 A | 11/2000 | Angel et al. | |
| 6,415,594 B1 * | 7/2002 | Durbin | F23R 3/286 60/748 |
| 6,993,916 B2 | 2/2006 | Johnson et al. | |
| 7,093,445 B2 | 8/2006 | Corr, II et al. | |
| 8,677,756 B2 * | 3/2014 | Poyyapakkam | F23C 5/08 60/740 |
| 8,683,804 B2 | 4/2014 | Boardman et al. | |
| 8,789,375 B2 | 7/2014 | Haynes | |
| 2003/0058737 A1 * | 3/2003 | Berry | B01F 5/0643 366/340 |
| 2009/0056336 A1 | 3/2009 | Chila et al. | |
| 2011/0072824 A1 * | 3/2011 | Zuo | F23D 14/62 60/746 |
| 2013/0133329 A1 | 5/2013 | Wang et al. | |
| 2014/0367495 A1 * | 12/2014 | Monaghan | F02M 55/008 239/408 |
| 2015/0285503 A1 * | 10/2015 | Li | F23R 3/14 60/772 |

OTHER PUBLICATIONS

Snyder, Timothy S. et al., Emission and Performance of a Lean-Premixed Gas Fuel Injection System for Aeroderivative Gas Turbine Engines, Jan. 1, 1996, pp. 1-7, vol. 118, Issue 1, http://gasturbinespower.asmedigitalcollection.asme.org/article.aspx?articleid=1419737.

Kempenaar, Joshua E. et al., Simulation of Airflow and Fuel Spray Through an Axial Swirler for Gas Turbine Applications, Aug. 10-14, 2008, pp. 1-10, Jacksonville, Florida, USA, http://proceedings.asmedigitalcollection.asme.org/ConferenceProceedings.aspx.

\* cited by examiner

FUEL-AIR PREMIXER FOR A GAS TURBINE

BACKGROUND

The subject matter disclosed herein relates to a fuel-air premixer. Specifically, the present disclosure relates to an airfoil-shaped centerbody for a fuel-air premixer in a gas turbine combustor.

Gas turbine and engine systems provide power for a variety of applications, such as oil and gas processing systems, commercial and industrial buildings, and vehicles. The gas turbine and engine systems may combust a mixture of fuel and air in a combustion system (e.g., chamber) to generate power. The combusted fuel and compressed air generate hot combustion gases, which, in turn, drive blades of a turbine to produce rotative power, for example. Accordingly, the combustion system of a gas turbine may include a mixer that produces a homogenous mixture of fuel and air to be fed into the combustion system. In some cases, the mixer may not produce a substantially homogenous mixture because of a limited amount of time that the fuel and air may spend in the mixer and because of undesirable effects, such as recirculation pockets. Therefore, gas turbine and engine systems may include a premixer designed to begin mixing the fuel and air before such components enter the mixer.

Exhaust gas produced by the gas turbine engine may include certain byproducts, such as nitrogen oxides ($NO_x$, including NO and $NO_2$), sulfur oxides ($SO_x$), carbon oxides ($CO_x$), and unburned hydrocarbons. The type of exhaust gases emitted, as well as the amount of exhaust gases emitted, may depend at least in part on a composition of the fuel-air mixture. Many industries and jurisdictions (e.g., coal-burning plants, federal and state governments, etc.) may have regulations and restrictions specifying the types and amounts of exhaust gases that a given system is permitted to emit. To achieve emissions levels specified by some jurisdictions, it may be desirable to enhance a mixing quality of the air-fuel mixture fed to a combustion chamber of the gas turbine and engine system. Accordingly, it is now recognized that an improved design of the premixer may be desirable.

BRIEF DESCRIPTION

In one embodiment, a fuel-air premixer for a gas turbine includes a dual counter-rotating swirler having a first rotor and a second rotor, where the first rotor and the second rotor are configured to spin about a shaft and the dual counter-rotating swirler is configured to direct a flow of air in a downstream direction. The fuel-air premixer also includes a centerbody coupled to the dual counter-rotating swirler via the shaft, where the centerbody includes first fuel orifices on a surface of the centerbody, the first fuel orifices are configured to inject fuel into the flow of air to create a fuel-air mixture, and the centerbody comprises an airfoil shape configured to block formation of a recirculation pocket.

In another embodiment, a fuel-air premixer for a gas turbine includes a dual counter-rotating swirler having a first rotor and a second rotor, where the first rotor and the second rotor are configured to spin about a shaft and the dual counter-rotating swirler is configured to form a turbulent shear layer of air. The fuel-air premixer also includes a centerbody coupled to the dual counter-rotating swirler via the shaft, where the centerbody includes fuel orifices on a surface of the centerbody, the fuel orifices are configured to inject fuel into the turbulent shear layer of air to create a fuel-air mixture, the centerbody comprises an airfoil shape, and no recirculation pocket forms between the centerbody and the fuel-air mixture.

In another embodiment, a fuel-air premixer for a gas turbine includes an airfoil-shaped centerbody coupled to a swirler and having a cross-section with an upper surface, a lower surface, a leading edge, and a trailing edge. The leading edge is upstream of the trailing edge with respect to a flow of a fuel-air mixture, and the fuel-air mixture is configured to substantially conform to the upper surface and the lower surface such that a recirculation pocket is absent.

In another embodiment, a method includes compressing a stream of air with a compressor, pre-mixing the stream of air with a fuel in a premixer having an airfoil centerbody, mixing the stream of air and the fuel in a mixer to form a substantially homogenous fuel-air mixture, combusting the substantially homogenous fuel-air mixture in a combustion chamber to form an exhaust gas, and emitting the exhaust gas to a surrounding environment.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Provided herein are embodiments of a fuel-air premixer for enhancing a quality of a fuel-air mixture received by a combustion chamber in a gas turbine system. In the gas turbine system, one or more gas turbine engines may combust a fuel to produce combustion gases for driving one or more turbine stages, each having a plurality of blades. Depending on the type of fuel that is combusted, exhaust emissions resulting from the combustion process may include nitrogen oxides ($NO_x$, including NO and $NO_2$), sulfur oxides ($SO_x$), carbon oxides ($CO_x$), and unburned hydrocarbons. Often, the composition of exhaust gases released by the gas turbine system, such as a gas turbine power plant, is subject to regulatory requirements. By way of example, regulations may specify an upper threshold level of a $NO_x$ concentration that may be released into the atmosphere, such as 25 parts-per-million (Ppm).

One technique for reducing the concentration of $NO_x$ (or another emissions compound) in an exhaust gas stream is to regulate a fuel-to-air ratio in the combustor of the gas turbine engine to maintain a low flame temperature within the combustor. Additionally, $NO_x$ emissions may be reduced by enhancing a mixing quality of the fuel and air. For example, improving the mixing quality of a fuel-air mixture may prevent recirculation pockets that may cause autoignition and/or flame-holding during combustion. As used herein, autoignition may refer to spontaneous combustion of the fuel-air mixture without introducing a flame and/or a spark. Autoignition may be undesirable as combustion may occur unexpectedly and may result in more $NO_x$ emissions due to inefficient combustion. Further, flame-holding may refer to a flame or a spark remaining in the combustion chamber for longer than desired. Accordingly, more $NO_x$ emissions may be produced as a result of the increased time that the flame is present in the combustion chamber.

To increase a quality of mixing, a fuel-air premixer may include an airfoil configuration (e.g., shape). In certain embodiments, the airfoil configuration may reduce recirculation pockets of fuel and/or air as it flows through the gas turbine system, which may prevent autoignition and/or flame-holding. The premixer may be located in the gas turbine system upstream of a mixer and the combustion chamber. In certain embodiments, the premixer may be integrated with a fuel injector such that fuel is injected into the gas turbine system and simultaneously mixed with compressed air. In other embodiments, the gas turbine system may include a fuel injector and a premixer as separate components. In any event, it is now recognized that the airfoil-shaped premixer may increase a mixing quality of the fuel and the air, as well as prevent recirculation pockets such that the gas turbine system exhausts fewer $NO_x$ emissions (or other emissions).

Figure 1:
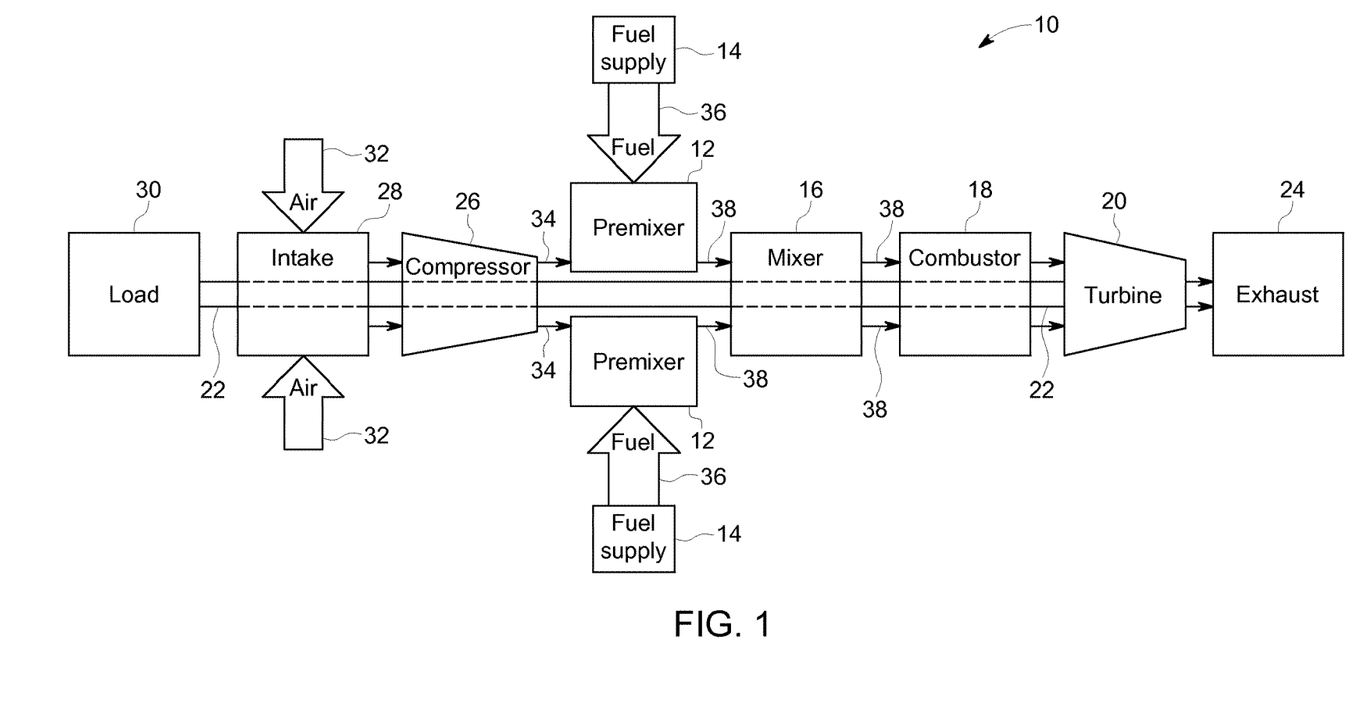
FIG. 1 is a block diagram of a gas turbine system that may be used to generate power, in accordance with an aspect of the present disclosure.

Turning to the drawings, FIG. 1 is a block diagram of a turbine system 10, such as may be used to generate power. As will be appreciated, the turbine system 10 may be suitable for use in a large-scale facility, such as a power plant for generating electricity that is distributed via a power grid to a city or town, or in a smaller-scale setting, such as part of a vehicle engine or small-scale power generation system. That is, the turbine system 10 may be suitable for a variety of applications and/or may be scaled over a range of sizes.

In the depicted example, the turbine system 10 includes a premixer 12, a fuel supply 14, a mixer 16, and a combustor 18. The fuel supply 14 may vary, depending on the embodiment, and may correspond to mechanisms suitable for delivering a fuel or fuel mixture, (e.g., a liquid fuel and/or gas fuel, such as natural gas or syngas) to the turbine system 10 through the premixer 12 (or a separate fuel injector) into the combustor 18. As discussed below, the premixer 12 may be configured to inject the fuel into the turbine system 10 and to mix the fuel with compressed air before the fuel-air mixture is received by the combustor 18. In certain embodiments, the fuel-air mixture may undergo further mixing in the mixer 16. Accordingly, the fuel-air mixture entering the combustor 18 may have a high mixing quality and the fuel-air mixture may be substantially homogenous (e.g., no large pockets of air and/or fuel).

When the fuel and air is sufficiently mixed, the combustor 18 ignites and combusts the fuel-air mixture, and passes hot pressurized exhaust gas into a turbine 20. As will be appreciated, the turbine 20 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 22 will cause the rotation of the shaft 22, which is also coupled to several components throughout the turbine system 10, as illustrated. Eventually, the exhaust of the combustion process may exit the turbine system 10 via an exhaust outlet 24.

A compressor 26 includes blades rigidly mounted to a rotor which is driven to rotate by the shaft 22. As air passes through the rotating blades, air pressure increases, thereby providing the combustor 18 with sufficient air for proper combustion. The compressor 26 may intake air to the turbine system 10 via an air intake 28. Further, the shaft 22 may be coupled to a load 30, which may be powered via rotation of the shaft 22. As will be appreciated, the load 30 may be any suitable device that may use the power of the rotational output of the turbine system 10, such as a power generation plant or an external mechanical load. For example, the load 30 may include an electrical generator, a propeller of an airplane, and so forth. The air intake 28 draws air 32 into the gas turbine system 10 via a suitable mechanism, such as a cold air intake. The air 32 then flows through blades of the compressor 26, which provides compressed air 34 to the combustor 18. In certain embodiments, the premixer 12 and/or the mixer 16 may inject the compressed air 34 and fuel 36, as a fuel-air mixture 38, into the combustor 18. In other embodiments, the compressed air 34 and fuel 36 may be injected directly into the combustor 18 for mixing and combustion.

Figure 2:
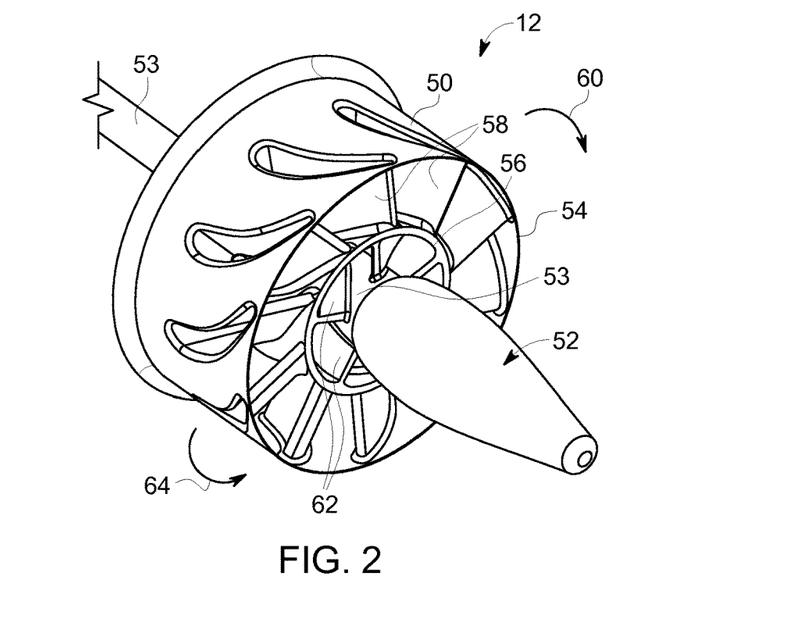
FIG. 2 is a perspective view of an embodiment of a premixer of the turbine system of FIG. 1 that has an airfoil-shaped configuration, in accordance with an aspect of the present disclosure.

As discussed above, a configuration of the premixer 12 may enable the fuel-air mixture 38 to have an enhanced mixing quality when entering the combustor 18. For example, FIG. 2 is a perspective view of an embodiment of the premixer 12 having an airfoil-shaped configuration. As shown in the illustrated embodiment of FIG. 2, the premixer 12 includes a swirler 50 and a centerbody 52. The centerbody 52 may be coupled to the swirler 50 via a shaft 53 (e.g., an axis) or another suitable device. In certain embodiments, the swirler 50 may include an outer rotor 54 (e.g., first rotor) and an inner rotor 56 (e.g., second rotor). The outer rotor 54 may include first blades 58 configured to move the outer rotor 54 in a first direction 60. Conversely, the inner rotor 56 may include second blades 62 configured to move the inner rotor 56 in a second direction 64, where the second direction 64 is substantially opposite the first direction 60. For example, the first blades 58 may be angled such that the outer rotor 54 spins (e.g., rotates) in a clockwise direction or a counterclockwise direction. Similarly, the second blades 62 may be angled such that the inner rotor 56 spins (e.g., rotates) in the opposite direction (e.g., clockwise or counterclockwise) of the outer rotor 54.

Therefore, the rotors 54, 56 of the swirler 50 may be counter-rotating. The counter-rotating configuration of the swirler 50 may enhance the mixing of the fuel 36 and the air 34 that enters the combustor 18. Specifically, the counter-rotating configuration may create a turbulent flow of the compressed air 34 through the premixer 12, which may enable enhanced mixing between the compressed air 34 and the fuel 36 injected by the centerbody 52, for example. In certain embodiments, the counter-rotating configuration may create a turbulent, shear layer of compressed air because the compressed air 34 may flow (e.g., swirl) in the two different directions 60, 64 downstream of the swirler 50. In certain embodiments, injecting the fuel 36 into the turbulent, shear layer may enhance a quality of mixing between the fuel 36 and the compressed air 34 because turbulent swirls of the compressed air 34 may generate a more homogenous fuel-air mixture 38.

The centerbody 52 of the premixer 12 may also enhance the mixing of the fuel 36 and the compressed air 34. For example, the centerbody 52 of the premixer 12 illustrated in FIG. 2 includes an airfoil-shaped configuration. As used herein, an airfoil configuration of the centerbody 52 may refer to an airfoil profile of at least one of the external surfaces when a cross-section of the centerbody 52 is taken. Additionally, the airfoil profile may include a diameter that varies from a leading edge to a trailing edge. For example, the diameter may increase slightly moving downstream of the leading edge. Subsequently, the diameter may decrease until it reaches the trailing edge. In certain embodiments, the airfoil shape of the centerbody 52 may be desirable because it may prevent flow separation between the air-fuel mixture 38 and the premixer 12 (e.g., pockets where the air-fuel mixture 38 does not contact a surface of the premixer 12). Flow separation may cause the air-fuel mixture 38 to undergo recirculation and/or form recirculation pockets (e.g., bubbles). Recirculation and/or recirculation pockets (e.g., bubbles) may be undesirable because they may lead to autoignition (e.g., ignition of the air-fuel mixture in the absence of a spark or flame), flame-holding (e.g., a flame or spark existing in the combustor 18 for longer than desired), and/or increased $NO_x$ emissions. In addition to reducing autoignition, flame-holding, and/or $NO_x$ emissions, the airfoil shape of the premixer 12 may also enhance an overall efficiency of the turbine system 10 by enabling a more efficient combustion process.

Figure 3:
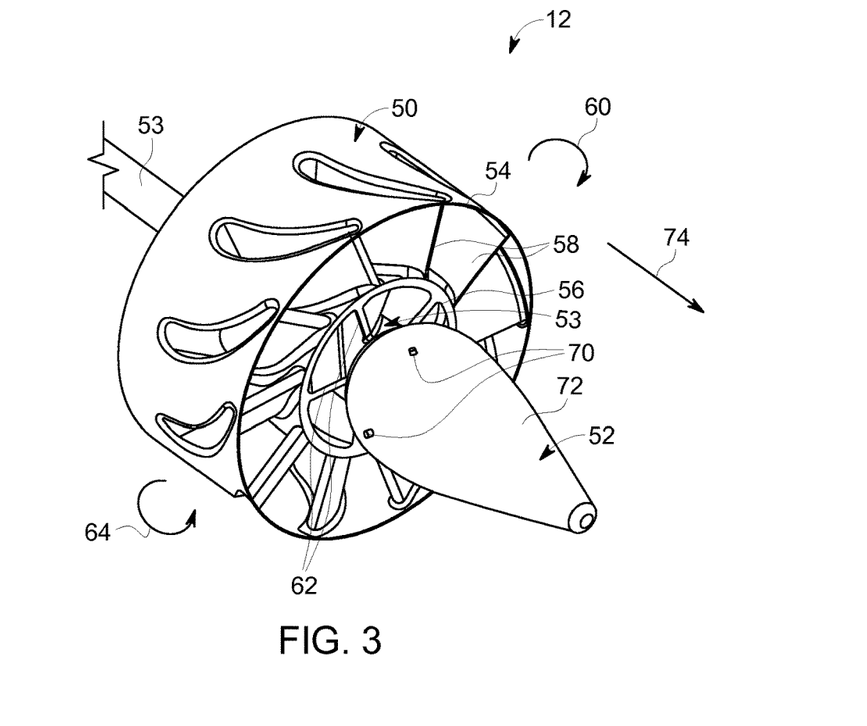
FIG. 3 is a perspective view of another embodiment of the premixer of FIG. 2 that includes fuel orifices disposed on a surface of a centerbody, in accordance with an aspect of the present disclosure.

The airfoil shape of the centerbody 52 may facilitate mixing of the air 34 and the fuel 36 in the turbine system 10. In certain embodiments, the centerbody 52 may include fuel orifices that inject the fuel 36 into a stream of the compressed air 34. For example, FIG. 3 is a perspective view of another embodiment of the premixer 12 that includes fuel orifices 70 disposed on a surface 72 of the centerbody 52. The fuel orifices 70 may provide a specified amount of the fuel 36 into the turbine system 10 to create a desired air-fuel ratio.

In certain embodiments, it may be desirable to inject the fuel 36 directly into a stream of the compressed air 34 to begin mixing the fuel 36 and the air 34 together. Therefore, it may be desirable to position the fuel orifices 70 along the surface 72 of the centerbody 52 at a position where the fuel 36 exiting the fuel orifice 70 may immediately, or nearly immediately, contact the compressed air 34. Accordingly, traditional premixers position the fuel orifices 70 on the surface 72 of the centerbody 52 at a position downstream from where recirculation pockets (e.g., bubbles) typically occur so that the fuel 36 does not become trapped inside a recirculation pocket (e.g., continuously recirculating in the recirculation pocket rather than flowing towards the combustor 18). As discussed above, the airfoil shape of the centerbody 52 may reduce and/or eliminate recirculation pockets along the surface of the centerbody 52. Therefore, the fuel orifices 70 may be disposed on the surface 72 at a position further upstream (e.g., with respect to a flow of the compressed air 34 and/or the fuel 36), such that the fuel 36 still contacts the compressed air 34 immediately, or nearly immediately, upon exiting the fuel orifices 70. Positioning the fuel orifices 70 further upstream (e.g., with respect to the flow of compressed air 34 and/or the fuel 36) may provide more time for the compressed air 34 and the fuel 36 to mix, thereby enhancing the mixing quality.

Additionally, the airfoil-shaped configuration of the premixer 12 may enable more fuel orifices 70 to be positioned on the surface 72 of the centerbody 52 when compared to a conical-shaped centerbody, for example, because the airfoil shape includes at least a portion having a larger circumference than the conical-shaped centerbody. For example, a cross-section of the centerbody 52 having an airfoil shape may include a diameter greater than a diameter of a cross-section of a centerbody having a traditional shape (e.g., a conical shape). In certain embodiments, the airfoil-shaped centerbody 52 may include between 0 and 20 fuel orifices 70, between 5 and 15 fuel orifices 70, between 7 and 12 orifices 70, or any suitable number of fuel orifices 70 that may enable sufficient mixing with the compressed air 34 stream. Including more fuel orifices 70 may further enhance mixing of the fuel 36 and the air 34 because it may enable the fuel 36 to be introduced to the stream of the compressed air 34 at more locations in the premixer 12. In other words, as more fuel orifices 70 are located on the surface 72 of the centerbody 52, the mixing quality of the fuel 36 and air 34 may improve as a result of greater atomization of the fuel 36 into the air 34.

Additionally, the airfoil shape may increase a speed of the compressed air flow through the premixer 12 and into the combustor 18. For example, as shown in FIG. 3, the diameter of the centerbody 52 decreases in a downstream direction 74 of the flow of compressed air 34. Therefore, the speed of the fuel-air mixture 38 flowing through the premixer 12 may increase because a resistance to the flow of the fuel-air mixture 38 created by surfaces of the centerbody 52 may decrease in the downstream direction 74 (e.g., the direction of compressed air flow).

The airfoil shape may also reduce the distance between the surface 72 of the centerbody 52 and a shear layer of the compressed air 34 caused by the dual, counter-rotating swirler 50. For example, a shear layer may be formed when the compressed air 34 flows in the first and second directions 60, 64. In certain embodiments, the fuel orifices 70 are positioned on the surface 72 of the centerbody 52 having the greatest circumference (e.g., a portion having the cross section with the largest area). Accordingly, the fuel 36 injected via the fuel orifices 70 may have a relatively short distance to travel to reach the shear layer of compressed air 34. The fuel orifices 70 may thus include a relatively large diameter because of the short distance between the fuel orifices 70 and the shear layer. For example, the fuel orifices 70 may include a diameter of between 0.1 centimeters (cm) and 3 cm, between 0.5 cm and 1 cm, between 0.75 cm and 0.9 cm, or any suitable diameter to enable sufficient mixing between the fuel 36 and the air 34. In certain embodiments, increasing the diameter of the fuel orifices 70 may enable more fuel to be injected into the stream of compressed air 34 by the premixer 12, thereby enhancing the mixing quality of the fuel-air mixture 38.

Figure 4:
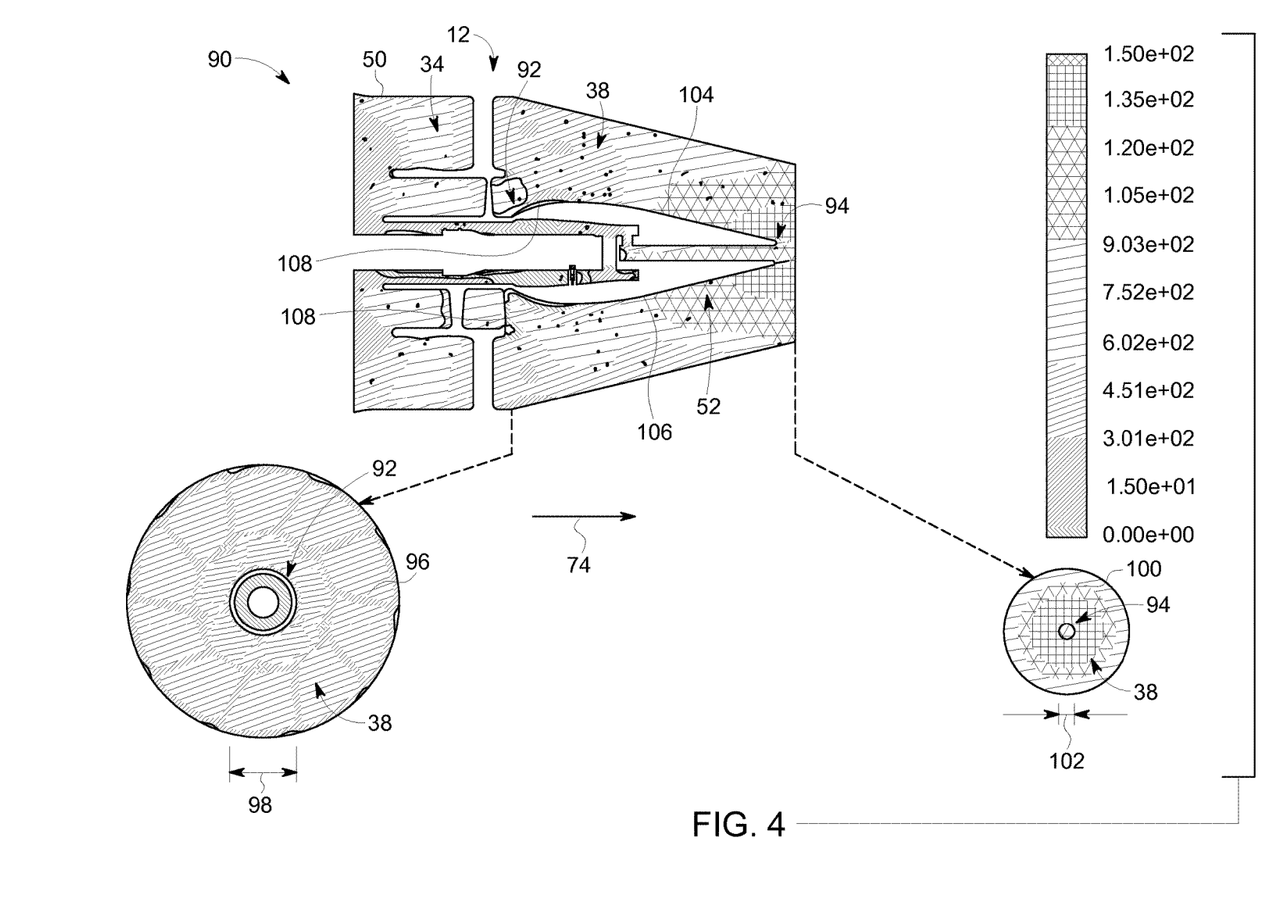
FIG. 4 is a computational fluid dynamics model illustrating a flow of a fuel-air mixture through the premixer of FIGS. 2 and 3, in accordance with an aspect of the present disclosure.

As discussed above, the airfoil shape of the premixer 12 may enhance the mixing quality of the fuel-air mixture 38 that enters the combustor 18. FIG. 4 is a computational fluid dynamics model 90 showing a flow of the fuel-air mixture 38 through the premixer 12 when recirculation pockets are present. The compressed air 34 may flow through the swirler 50 in the downstream direction 74. The compressed air 34 may then flow over surfaces of the centerbody 52. In certain embodiments, the fuel orifices 70 may inject the fuel 36 into the flow of compressed air 34, thereby creating the fuel-air mixture 38. The fuel-air mixture 38 may continue to flow over the surfaces of the centerbody 52 in the downstream direction 74 toward the combustor 18.

In certain embodiments, a velocity of the fuel-air mixture may increase as the fuel-air mixture moves in the downstream direction 74 as a result of the airfoil-shape of the centerbody 52. For example, a velocity of the fuel-air mixture may increase as it moves from a leading edge 92 of the centerbody 52 (e.g., an upstream end having a larger cross sectional area and/or circumference) toward a trailing edge 94 of the centerbody 52 (e.g., a downstream end having a smaller cross sectional area and/or circumference). A cross section 96 of the flow of the fuel-air mixture 38 over the leading edge 92 shows the centerbody 52 having a first diameter 98. Similarly, a cross section 100 of the fuel-air mixture 38 over the trailing edge 94 shows the centerbody 52 having a second diameter 102. In certain embodiments, the first diameter 92 may be larger than the second diameter 102 such that a first sloped surface 104 (e.g., an upper surface) and a second sloped surface 106 (e.g., a lower surface) are formed between the leading edge 92 and the trailing edge 94. The sloped surfaces 104 and 106 may facilitate flow of the air-fuel mixture over the centerbody 52, thereby increasing the velocity of the air-fuel mixture as it moves in the downstream direction 74 (e.g., from the leading edge 92 to the trailing edge 94).

In the illustrated embodiment of FIG. 4, the premixer 12 forms a recirculation pocket 108. The recirculation pocket 108 may be formed as a result of inefficient flow of the fuel-air mixture 38 over the centerbody 52. In certain embodiments, the velocity of the fuel-air mixture 38 in the recirculation pocket 108 may be substantially zero. Accordingly, an amount (e.g., volume) of the fuel 36 and the compressed air 34 that enters the combustor 18 may be more or less than a desired amount because the recirculation pocket 108 may affect the flow of the fuel-air mixture 38 through the premixer 12. However, it should be noted that because of the airfoil-shape of the centerbody 52, the recirculation pocket 108 may include a size that is less than a size of a recirculation pocket that may form in traditional premixer designs. Therefore, the airfoil-shaped centerbody 52 may reduce a size of the recirculation pocket 108, thereby enhancing a performance of the turbine system 10. Further, it may be desirable to further reduce the size of the recirculation pocket 108 such that the recirculation pocket 108 is substantially or generally eliminated from the premixer 12. Accordingly, it may be desirable to adjust a position and/or an amount of the orifices 70 on the centerbody, a flow rate of the fuel-air mixture 38 through the premixer 12, and/or a diameter of the airfoil-shape of the centerbody 52 to further reduce and/or eliminate the recirculation pocket 108 and enhance the efficiency of the turbine system 10.

Figure 5:
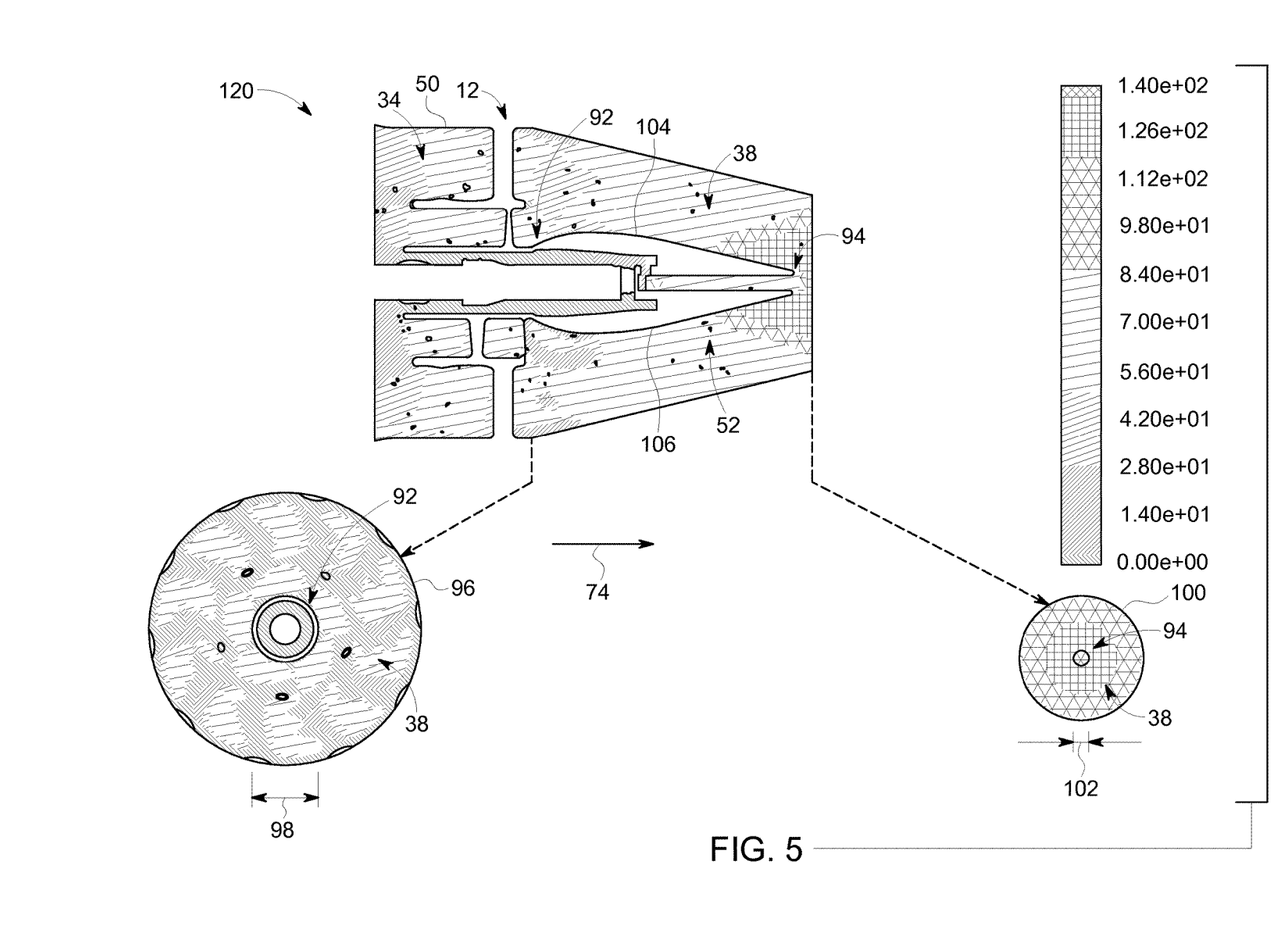
FIG. 5 is a computational fluid dynamics model showing a flow of the fuel-air mixture through the premixer of FIGS. 2 and 3 without a recirculation pocket, in accordance with an aspect of the present disclosure.

For example, FIG. 5 is a computational fluid dynamics model 120 showing a flow of the fuel-air mixture through the premixer 12 without the recirculation pocket 108. As shown in the illustrated embodiment of FIG. 5, the recirculation pocket 108 has been substantially eliminated as a result of an enhanced geometry (e.g., shape) of the centerbody 52. Accordingly, the flow of the fuel-air mixture 38 through the premixer 12 may be enhanced, thereby increasing an efficiency of the overall turbine system 10. In certain embodiments, the reduction and/or elimination of the recirculation pocket 108 may prevent undesirable effects, such as autoignition and/or flame holding. Such undesirable effects may lead to decreased performance of the combustor 18 and/or increased NOx emissions (or other emissions). Accordingly, it is now recognized that utilizing the airfoil-shaped centerbody 52 may substantially eliminate and/or reduce the recirculation pocket 108 and thus, lead to an increased efficiency of the turbine system 10 and/or less NOx emissions.

It may be desirable to incorporate the airfoil-shaped centerbody 52 into existing turbine systems to increase the efficiency and/or reduce NOx emissions. Therefore, the airfoil-shaped centerbody 52 may include a size that may be substantially similar to existing centerbody configurations. Additionally, the airfoil-shaped centerbody 52 may be configured to operate under substantially similar conditions of existing centerbodies. For example, Table 1 is a data table showing operating conditions of the airfoil-shaped centerbody 52 compared to a typical centerbody of a double annular counter-rotating swirl (DACRS) premixer. A DACRS centerbody may include another shape other than the airfoil shape of the present disclosure. For example, the DACRS typically includes a conical-shaped centerbody that may facilitate formation of recirculation pockets 108 between the centerbody and a flow of the fuel-air mixture 38. The dual counter-rotating swirler 50 may generate a turbulent shear layer of air 34 and/or fuel 36, which may create a swirling effect. The conical shape of the centerbody may not facilitate flow of the fuel-air mixture 38 over the centerbody, but rather increase swirling of the fuel-air mixture 38, thereby producing recirculation pockets. As discussed above, the airfoil-shape of the centerbody 52 may facilitate flow of the fuel-air mixture over the surface 72 of the centerbody 52, thereby reducing and/or substantially eliminating the recirculation pocket 108.

TABLE 1

Operating Conditions of Airfoil Centerbody Compared to DACRS Premixer Centerbody

|  | Baseline | Airfoil CB |
| --- | --- | --- |
| Outer swirler | 72.6% | 74.3% |
| Inner swirler | 23.8% | 25.2% |
| Center pass | 3.6% | 0.5% |
| Outer/Inner | 3.05:1 | 2.95:1 |
| ΔP (psi) | 14.2 | 14.3 |
|  | (3.43%) | (3.46%) |
| Swirl number | 0.480 | 0.496 |

As shown in Table 1, the airfoil-shaped centerbody 52 operates under substantially similar conditions to the conical-shaped centerbody of the DACRS premixer and produces substantially similar results (e.g., change in pressure, swirl number). However, the airfoil-shaped centerbody 52 reduces and/or eliminates the recirculation pocket 108, which may prevent autoignition and/or flame holding, thereby enhancing the efficiency of the overall turbine system 10 and/or reducing $NO_x$ emissions. Accordingly, the airfoil-shaped centerbody 52 may be configured to operate under the same, or substantially the same, conditions as the DACRS centerbody, but increase the efficiency of the overall gas turbine system 10.

Figure 6A:
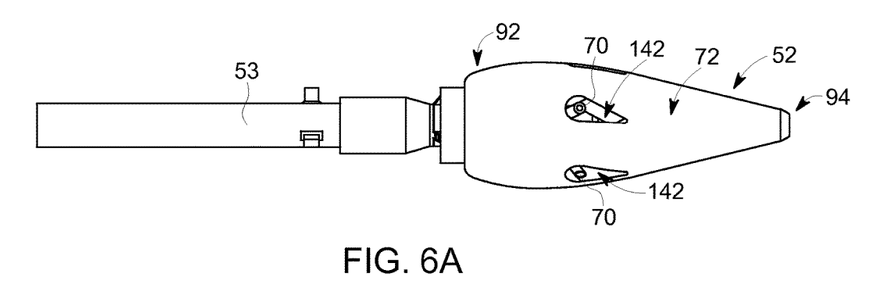
FIGS. 6A, 6B, and 6C are side views of embodiments of the airfoil-shaped centerbody of the premixer of FIGS. 2 and 3, each having different configurations of fuel orifices, in accordance with an aspect of the present disclosure.
Figure 6B:
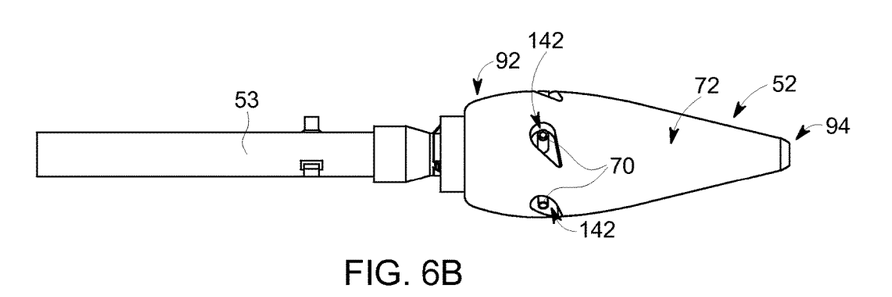
Figure 6C:
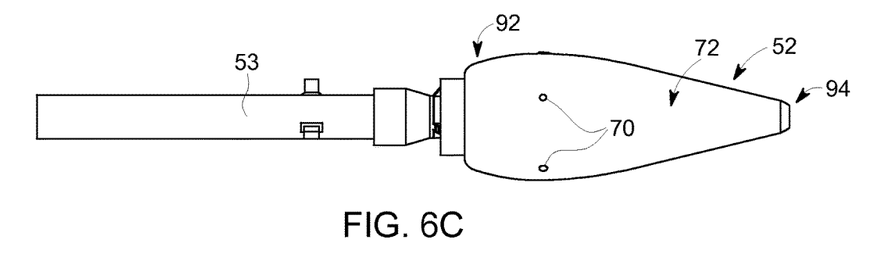

As discussed above, the airfoil-shaped centerbody 52 may include one or more fuel orifices 70 to inject fuel into the stream of compressed air 34. Additionally, the airfoil-shape may enable more fuel orifices 70 to be positioned on the surface 72 of the centerbody 52. FIGS. 6A, 6B, and 6C are side views of embodiments of the airfoil-shaped centerbody 52 having different configurations of the fuel orifices 70.

For example, FIG. 6A shows the fuel orifices 70 positioned on the surface 72 of the centerbody 52 approximately halfway between the leading edge 92 and the trailing edge 94. In certain embodiments, the fuel orifices 70 may be surrounded by teardrop-shaped openings 142 in the surface 72 of the centerbody 52. Such openings 142 may facilitate a flow of the fuel 36 exiting the fuel orifices 70 into the stream of compressed air 34. For example, the teardrop shape of the openings 142 may direct the fuel 36 in a desired direction to enhance a mixing quality between the fuel 36 and the air 34 as well as to prevent the recirculation pocket 108 from forming.

As shown in the illustrated embodiment of FIG. 6A, the centerbody 52 is coupled to the shaft 53. The shaft 53 may also be coupled to the swirler 50 and configured to enable the inner and outer rotors 54, 56 of the swirler 50 to rotate about the shaft 53.

FIG. 6B shows the fuel orifices 70 positioned on the surface 72 of the centerbody 52 further upstream (e.g., with respect to the flow of the air 34 and/or the fuel 36) from a halfway point between the leading edge 92 and the trailing edge 94. As discussed above, reducing and/or eliminating the recirculation pocket 108 may enable the fuel orifices 70 to be positioned further upstream at a position where the recirculation pocket 108 typically forms. Accordingly, the quality of mixing between the fuel 36 and the air 34 may be enhanced because the fuel 36 is introduced into the stream of compressed air 34 at a point further upstream of the combustor 18, thereby providing more time and/or distance for the fuel 36 and the air 34 to mix before combustion. In certain embodiments, the fuel orifices 70 may be surrounded by the teardrop-shaped openings 142 in the surface 72 of the centerbody 52. Such openings 142 may facilitate a flow of fuel 36 exiting the fuel orifices 70 into the stream of compressed air 34. For example, the teardrop shape of the openings 142 may direct the fuel 36 in a desired direction to enhance a quality of mixing between the fuel 36 and the air 34 as well as to prevent the recirculation pocket 108 from forming. In the illustrated embodiment of FIG. 6B, the teardrop-shaped openings 142 have a different angle than the openings 142 in FIG. 6A. Accordingly, the fuel 36 injected by the centerbody 52 of FIG. 6B may be directed in a different direction than the fuel 36 injected by the centerbody 52 of FIG. 6A.

FIG. 6C shows the fuel orifices 70 positioned on the surface 72 of the centerbody 52 further upstream than the halfway point between the leading edge 92 and the trailing edge 94. As discussed above, reducing and/or eliminating the recirculation pocket 108 may enable the fuel orifices 70 to be positioned further upstream (e.g., with respect to a flow of the fuel 36 and/or the air 34) where the recirculation pocket 108 typically forms. Accordingly, the quality of mixing between the fuel 36 and the air 34 may be enhanced because the fuel 36 is introduced into the stream of compressed air 34 at a point further upstream of the combustor 18, thereby providing more time and/or distance for the fuel 36 and the air 34 to mix before combustion.

As shown in the illustrated embodiment of FIG. 6C, the fuel orifices 70 are not surrounded by the openings 142. Additionally, the fuel orifices 70 of FIG. 6C include a diameter that is smaller than a diameter of the fuel orifices 70 of FIGS. 6A and 6B. Accordingly, less fuel may be injected by the centerbody 52 of FIG. 6C; however, the fuel may be configured to travel farther (e.g., outward from the surface 72 of the centerbody 52) as a result the smaller diameter. Accordingly, utilizing the small diameter fuel orifices 70 may be desirable when the fuel orifices 70 are positioned relatively far from the shear layer of the compressed air 34 created by the dual counter-rotating swirler 50.

It should be recognized that the fuel orifices 70 on the surface 72 of the centerbody 52 may include any suitable diameter for injecting the fuel 36 into the stream of compressed air 34 such that the fuel 36 may reach the turbulent shear layer and sufficiently mix with the compressed air 34. Additionally, in certain embodiments, the fuel orifices 70 may be surrounded by the openings 142 having any suitable shape and/or configuration for facilitating flow of the fuel 36. In other embodiments, the fuel orifices 70 may not be surrounded by the openings 142.

Figure 7:
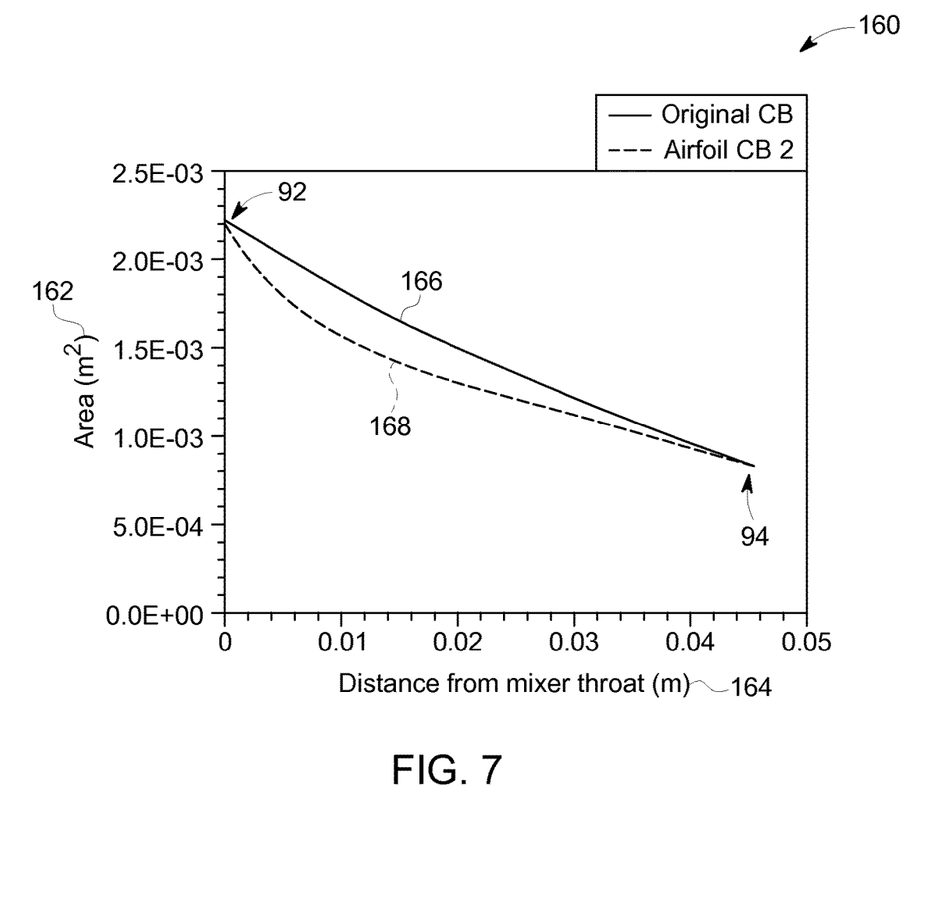
FIG. 7 is a graphical representation of a cross sectional area between a surface of the centerbody and a surface of a casing of the premixer of FIGS. 2 and 3 as a function of a distance from a leading edge of the centerbody, in accordance with an aspect of the present disclosure.

As discussed above, the airfoil-shaped centerbody 52 may decrease the distance between the surface 72 of the centerbody 52 (e.g., and thus the fuel orifices 70) and the shear layer of the compressed air 34 formed by the swirler 50. For example, FIG. 7 is a graphical representation 160 of a cross sectional area 162 between the surface 72 of the centerbody 52 and a surface of a casing of the premixer 12 as a function of a distance 164 from the leading edge 92 of the centerbody 52. The graph 160 shows a first curve 166 and a second curve 168. The first curve 166 represents a traditional DACRS premixer having a conical-shaped centerbody. The second curve 168 represents the premixer 12 having the airfoil-shaped centerbody 52. As shown in the illustrated embodiment, the area 162 between the surface 72 of the centerbody and the surface of the premixer casing is substantially the same at the leading edge 92 and the trailing edge 94 for both the first and second curves 166, 168. Therefore, the airfoil-shaped centerbody 52 may be configured to be integrated into a turbine system 10 that utilizes a DACRS premixer and enhance the efficiency of such system 10.

Moreover, the graph 160 shows that the area 162 between the surface 72 of the centerbody 52 and the surface of the premixer casing decreases from the leading edge 92 to the trailing edge 94 of the airfoil-shaped centerbody 52 as compared to the conical shaped centerbody. Accordingly, the distance between the surface 74 of the centerbody 52 and the shear layer of compressed air formed by the swirler 50 is also reduced, thereby decreasing the distance that the injected fuel 36 may travel before reaching the shear layer where enhanced mixing may occur. Thus, the diameter of the fuel orifices 70 may be increased to enhance the atomization of the fuel 36 into the compressed air 34.

Technical effects of the invention include a fuel-air premixer for a turbine system that may increase efficiency of the turbine system and reduce $NO_x$ emissions. The fuel-air premixer includes a swirler and a centerbody. The swirler is configured to direct a flow of air through the premixer, and the centerbody is configured to inject fuel into the flow of air. Additionally, the centerbody includes an airfoil shape that reduces and/or substantially eliminates recirculation pockets to prevent autoignition and/or flame holding in a combustion chamber. Accordingly, the turbine system may produce fewer $NO_x$ emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A fuel-air premixer for a gas turbine, comprising:
a dual counter-rotating swirler having an upstream side and a downstream side opposite the upstream side, the dual counter-rotating swirler configured to receive a flow of compressed air at the upstream side and direct the flow of compressed air in a downstream direction to the downstream side, the dual counter-rotating swirler comprising a first rotor and a second rotor, wherein the first rotor is annularly disposed around the second rotor and includes first blades configured to rotate the first rotor in a first direction by the flow of compressed air and the second rotor being disposed about a shaft and including second blades configured to rotate the second rotor in a second direction opposite the first direction by the flow of compressed air, and the dual counter-rotating swirler being configured to create a turbulent flow of air in the downstream direction; and a centerbody coupled to the dual counter-rotating swirler at the downstream side of the dual counter-rotating swirler via the shaft, wherein the centerbody extends from the dual counter-rotating swirler in the downstream direction and comprises a leading edge at an upstream side of the centerbody configured to receive the turbulent flow of air from the dual counter-rotating swirler and a trailing edge at a downstream side of the centerbody opposite the upstream side, wherein a diameter of the centerbody increases and then decreases when moving from the leading edge to the trailing edge, the centerbody further comprising first fuel orifices on a surface of the centerbody, the first fuel orifices being configured to inject fuel into the turbulent flow of air to create a fuel-air mixture, and the centerbody comprises an airfoil shape.

2. The fuel-air premixer of claim 1, wherein the first fuel orifices comprise a teardrop shape.

3. The fuel-air premixer of claim 1, wherein the first fuel orifices are positioned closer to the leading edge than the trailing edge.

4. The fuel-air premixier of claim 1, wherein the first fuel orifices are positioned at a largest diameter of the airfoil shape.

* * * * *